Figure 1:
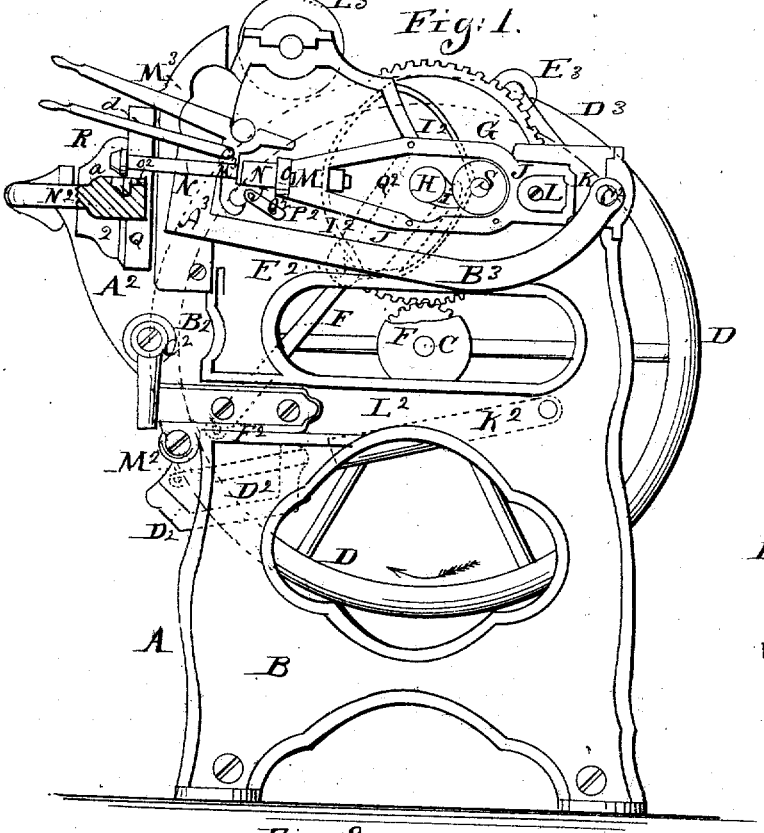

J. M. Jones. Sheet 1, 3 Sheets.

Printing Press

No. 3,783. Reissued Dec. 28, 1869.

Witnesses:

Jno. W. Conway

Wm. H. Eggleston

Inventor:

J. M. Jones

N. PETERS, PHOTO-LITHOGRAPHER, WASHINGTON, D. C.

J. M. Jones. Sheet 2, 3 Sheets.

Printing Press.

No. 3,783. Reissued Dec. 28, 1869.

Witnesses:

Jno W Conning

Jno F. Eggleston.

Inventor:

J. M. Jones.

N. PETERS, PHOTO-LITHOGRAPHER, WASHINGTON, D. C.

J. M. Jones. Sheet 3, 3 Sheets.
Printing Press.
No. 3,783. Reissued Dec 28, 1869.
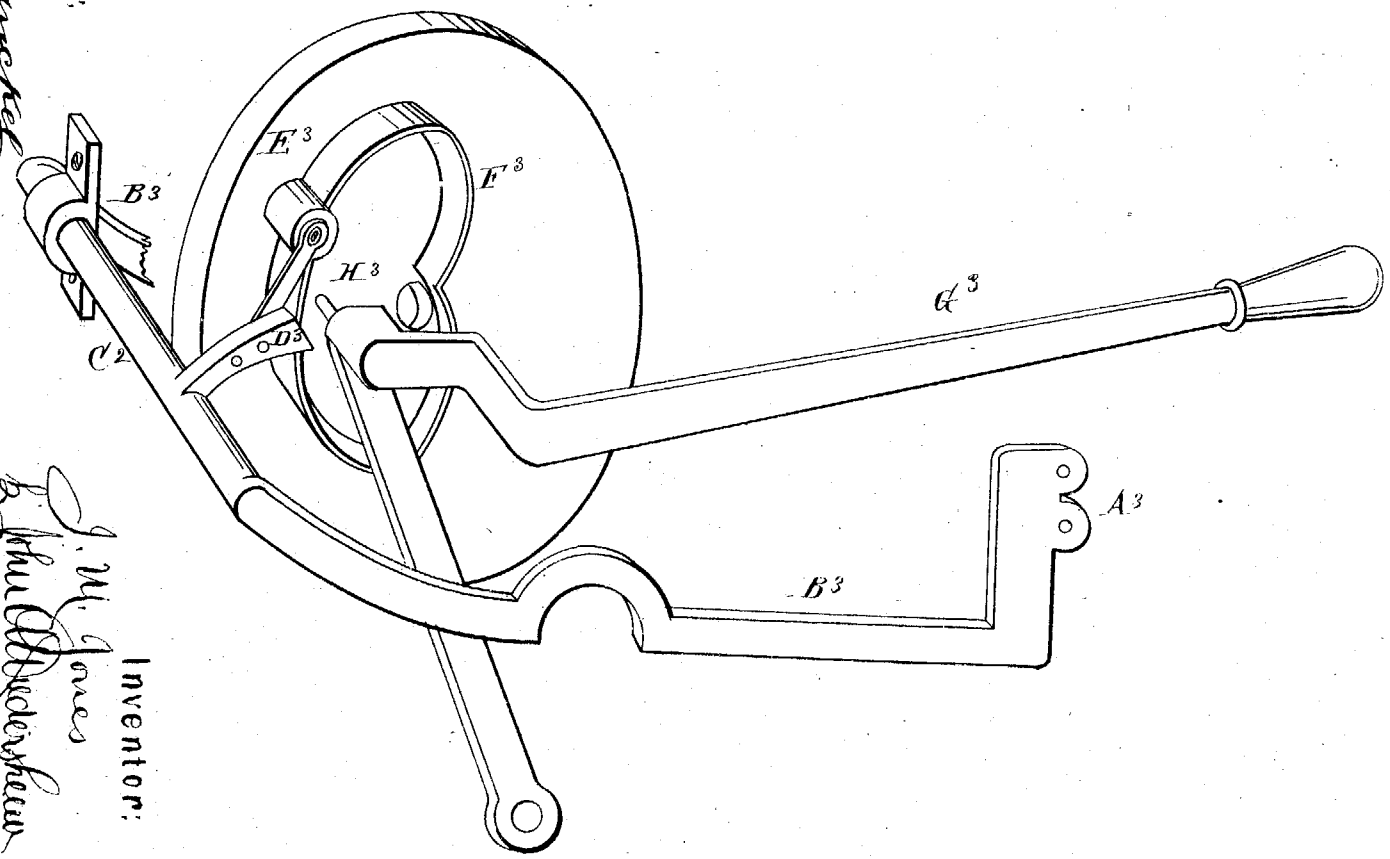
Witnesses:
Wilt. H. Finckel
Aug. H. Raymond
Inventor:
J. M. Jones
By John Wyckersheim
Atty.
N. PETERS, PHOTO-LITHOGRAPHER, WASHINGTON, D. C.

UNITED STATES PATENT OFFICE.

J. M. JONES, OF PALMYRA, NEW YORK, ASSIGNOR TO HIMSELF AND HENRY JOHNSON AND GEORGE M. BOWMAN, OF SAME PLACE.

IMPROVEMENT IN PRINTING-PRESSES.

Specification forming part of Letters Patent No. 80,865, dated August 11, 1868; Reissue No. 3,783, dated December 28, 1869.

*To all whom it may concern:*

Be it known that I, J. M. JONES, of Palmyra, in the county of Wayne and State of New York, have invented new and useful Improvements in Printing-Presses; and I do hereby declare that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The present invention consists, first, in a novel arrangement of parts for bringing the "platen" of the press up nearly to the "form," where, by means of an arm or arms made to interlock therewith and to move in the proper direction, the platen is then brought against the form and the impression given; second, in combination with the arm or arms above referred to for moving the platen to take the impression from the form, so arranging a cam or cams, or its or their equivalents, as to then operate to disengage said arms from the platen, and leaving it free to fall or to be moved away from the form, thus throwing off the impression thereon; third, in the combination, with the said cams for disengaging the impression-arms from the platen, of a lever or levers for so holding such cams as to prevent the said arms from becoming engaged with the platen while the press is running, if so desired; fourth, in a novel manner of securing the "chase" to the bed of the press; fifth, in so arranging a lever in connection with the frame or other equivalent part for carrying the ink-roller over the form, or the device or devices for operating such frame, that the ink-roller can be detained upon the ink-cylinder, when desired, for distributing the ink, or for any other purpose; sixth, in providing the frame carrying the platen with a box or receptacle for the cards, &c., printed to drop or fall into in such a manner as to operate also as a counter-balance or weight to the platen; seventh, in detaining the inking-rollers in contact with the distributing-cylinder during the will or requirements of the operator, with or without stopping the other parts of the machine, for a purpose hereinafter described.

Having thus in general terms stated the principal features of the improvements embraced in the present invention, I will now proceed to explain the same in detail, reference being had to the accompanying plate of drawings, in which—

Figure 4:
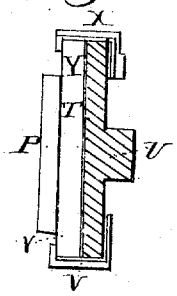
Figure 2:
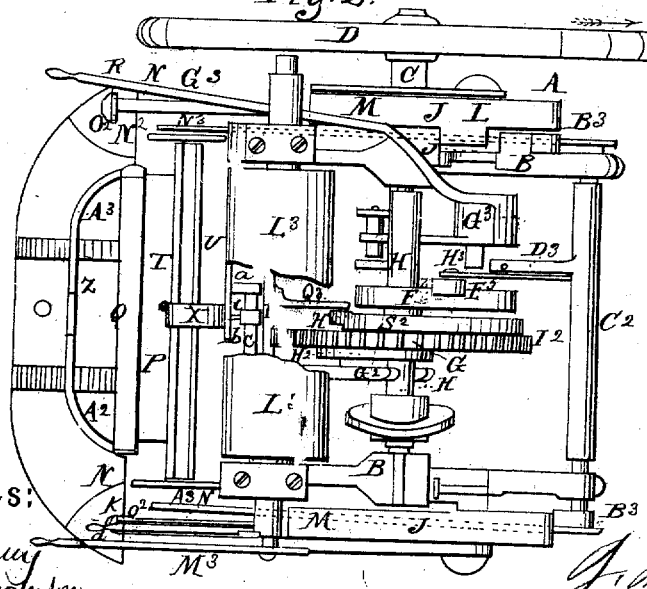
Figure 5:
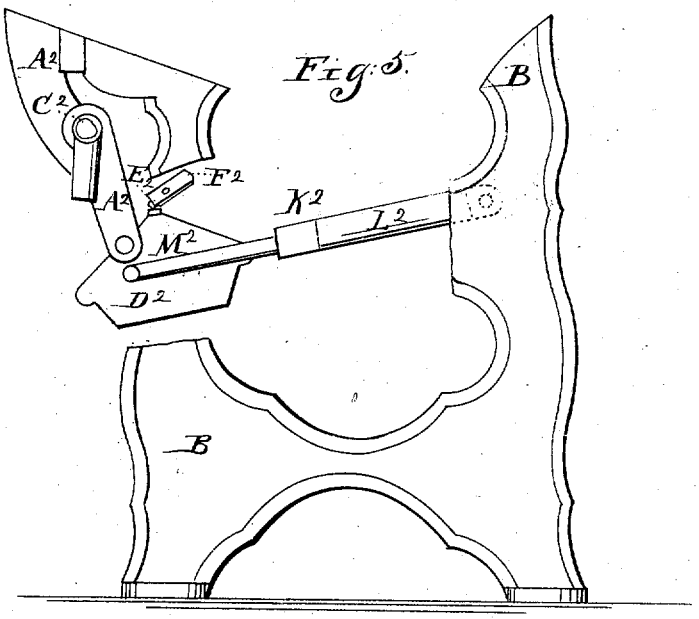
Figure 6:
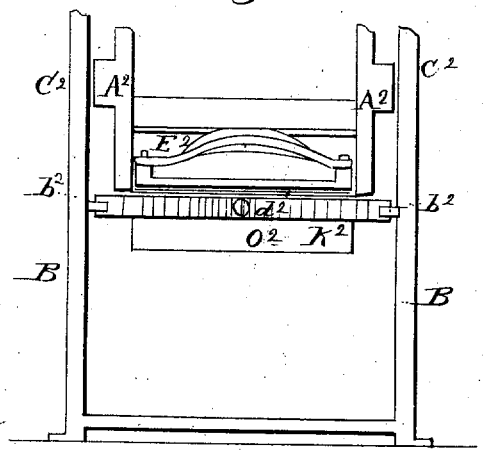

Figure 1 is a side elevation of a printing-press made according thereto; Fig. 2, a plan or top view of the same, and Figs. 3 and 4 detail views to be hereinafter referred to. Figs. 5, 6, and 7 are views of parts to be hereinafter referrrd to.

A in the drawings represents the supporting frame-work of the press, which consists of two parallel upright frames, B, of suitable form and construction therefor, joined and braced together in any proper manner; C, a shaft, to which a fly or balance wheel, D, is secured, and through which the power necessary to drive the press is to be transmitted. This shaft C is horizontally arranged to turn in bearings of one of the frames B, and at its inner end has secured to it a pinion-wheel, F, which engages with a large gear-wheel, G, keyed to a horizontal shaft, H, above, that extends entirely across the frame-work A, turning in suitable bearings of each of its frames B.

Upon each end of the gear-wheel shaft H is fixed a similar arm, I. These arms I in both cases are incased by similar boxes, J, that are located upon the outside of the frames B, to move in a horizontal direction, or nearly so, by their slotted ends K, upon pins L, suitably fixed therefor in said frames, their opposite ends, M, being continued by arm N, in each case, through fixed guides or loops O. The arms N are extended toward the front of the press, where the form P is located, and the platen Q arranged to operate, as will be presently explained, and at their outer ends have a head or cap-piece, R. Connected with each of these boxes J is a bent spring, $J^2$, suitably located to throw or draw back the boxes after being moved by means of the arms I.

Within each of the boxes J is arranged a roller, S, for the shaft-arms I, as their shaft is turned, to bear against, and thus move the said boxes upon their guide-pins L, as and for a purpose to be hereinafter stated. The form P is fixed to the chase T. This chase T is secured to the front of the bed U of the press in an upright position by means of hooks V, fixed in the bed U, that grasp the lower edge, W, to the chase, and the hook X, grasping the upper edge, Y. This upper hook, X, is fixed to one end of a lever, *a*, hung at its other end to a fulcrum on the rear side of the bed U, with which lever *a* is engaged the arm *b* to a horizontal shaft, *c*, (turning in suitable bearings of the frame-work,) that at its outer end is provided with a proper lever or handle, *d*, for turning it, and thus to raise or lower said hook X, as the case may be, and as may be desired, for detaching or attaching the form from the bed U.

The platen Q is secured to a yoke, Z, that constitutes the cross-bar to two parallel side pieces, $A^2$, and hung at $C^2$ between the frames B, in a suitable position for the platen to be swung up and against the form. These side pieces, $A^2$, are extended beyond their points of suspension, and between their lower and outer ends is hung an open box, $D^2$, so as to swing thereon, that in the operation of the press serves not only as a receptacle for the cards, &c., printed and thrown off of the form to drop or fall into, but as a counter-balance or weight to the platen.

$E^2$ is a bar extended in an upward curve or arc shape across the box $D^2$ from one end to the other. On this bar $E^2$ is hung the lower end of a rod, $F^2$, which, at its upper end, $G^2$, is made of a fork shape, and by such end is arranged to move over and upon the gear-wheel shaft H. This rod $F^2$, one side near its forked end, is provided with a friction-roller, $H^2$, that is properly located to bear upon and against the periphery of the cam-flange $I^2$, formed upon one side or face of the gear-wheel G, hereinbefore referred to. This cam $I^2$ is made of such a shape that when the wheel carrying it is revolved the rod $F^2$, through its friction-roller, will be moved in the proper direction to swing the platen up toward the form, and thus into position for the impression-arms N to take it, as will soon be described, and to there leave it, before the impression is given, the latter being effected by said arms N.

$K^2$ is a spiral spring arranged in a tube-case, $L^2$, upon the inside of one of the frames B, wherein, at one end, it is fixed, and at the other, through a rod, $M^2$, hung to the box $D^2$, so that being distended as the platen is swung up it will by its contraction tend to facilitate the swinging off of the platen from the form. (See Fig. 5.) Another form of such spring is shown in Fig. 6, in which a straight spring, $K^3$, is shown attached to the rear side of the box $D^2$ at $d^2$, its ends being free. When the platen moves upward, the spring $K^3$ at each end comes in contact with pins or projections $b^2$ in each side of the frame B. The spring is thus bent, and, after the platen is released from the arms N, assists in retracting the platen from the bed in regaining its legitimate shape.

The yoke to which the platen is fixed is extended upon each side, so as to form side arms, $N^2$, thereto, that are notched or recessed similarly upon their upper surfaces, $O^2$, for the heads of the extension-arms N of the boxes to fit and drop into when the platen, as above described, has been brought up nearly to the form.

$P^2$ is a horizontal shaft extended across the frame-work A, in bearings of which it turns, and provided at each end with an arm, $Q^2$, in proper position to act upon and against the under side of the extension-arms N to the boxes J, and thus to raise them. This shaft $P^2$ is provided with an arm, $Q^3$, between the two side frames, B, which arm carries a friction-roller, $R^2$, that, as the gear-wheel G turns, runs upon the flange $S^2$, projecting from its face $T^2$. (See Fig. 3.) This flange $S^2$ extends around the wheel, and for the greater part of its length is concentric therewith, but made of a cam shape for the remainder, as seen at $U^2$. This flange operates by its concentric portion to hold the extension-arms N of the boxes in a raised position, and by its cam portion to so turn or rock the shaft $P^2$ as to allow the said arms N to drop or fall, and then again to raise them, this falling of the arms N taking place when, by the movement of the press, the platen has been brought up nearly against the form, and being provided for, then allowing such arms to become engaged with the recesses provided therefor in the arms of the platen-yoke.

The ink-rollers are carried between the arms $A^3$, that, by their extension-pieces $B^3$, are fixed to a rocker-shaft, $C^3$, turning in suitable bearings of the frames B, and as the arrangement of such rollers upon the arms forms no part of the present invention, I do not deem it necessary to herein further explain it, as it may be of any of the arrangements now in common use, or of one I have invented, and is hereafter to be embraced by me in a separate and another application for Letters Patent.

Figure 3:
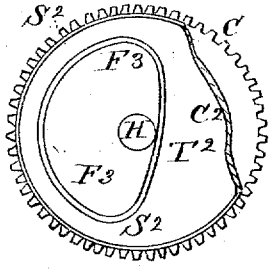

The rocker-shaft $C^3$ is provided with an arm, $D^3$, which at its outer end carries a friction-roller, $E^3$, arranged to bear upon and travel over the cam-flange $F^3$ to the gear-wheel G, which cam is shown in Fig. 3, and is so formed as to rock the shaft at the proper time for carrying the ink-rollers over the form.

$G^3$ is a lever-arm, provided with a rest, $H^3$, by means of which the arm $D^3$ to the shaft can be held off from the cam-flange $F^3$, and the ink-rollers in contact with the ink-cylinder $L^3$ for distributing the ink thereon, &c.

The operation of the several parts to the press constructed and arranged as above described is as follows: The fly-wheel D is turned in the direction represented by the red arrows in the drawings, which, through the connecting parts with the platen, causes the platen to be swung up nearly to the form, where, leaving it, the arms N then engage therewith, and by the horizontal movement thus imparted to the boxes J, through the action of the arms H upon the inside of the same, such platen is made to move up against the form, thereby taking an impression therefrom, when, the revolution of the fly-wheel continuing, the arms N are disengaged from the platen, which then falls or swings off from the form into position for being again carried up thereto, as before, and so on as long as the machine is run. The disengagement of the impression-arms N from the platen is effected through the rocker-arms $Q^2$, that raise them in the proper time therefor. From the platen the cards, &c., printed, fall down into the box $D^2$, which box, as it is suspended to the frame carrying the platen, serves as a counter weight or balance therefor.

$M^3$ is a hook-lever hung to one of the side frames, B, in position for its hook end to engage with the pin *j* in the rocker-arm $Q^2$, and thus enable it to be swung into a position suitable for so holding the impression-arms N that they cannot connect with the platen as the machine is running, the convenience of which lever is obvious to all experienced in the running of printing-machines.

The ink-rollers are detained on the cylinder, at the will of the operator, without stopping the other parts of the machine for the purpose of distribution. The rollers are detained upon the cylinder when the other parts of the machine are stopped for other purposes. For instance, the operator, while working a job, may discover something wrong in his form which he wishes to correct. To get at the form he must stop his press with the platen open or back to the feed-board, and this position of the platen, without the detention device, would of necessity leave the rollers directly over and on the form, so that if it should be more underlay that is wanted he would be obliged to take out the form, which would be very troublesome. With the present device he could raise the rollers to the cylinder, detain them there, and by laying the nippers flat upon the platen and raising the chase-hook he can lay the upper side of the chase over upon the platen and underlay or fix the form as may be required with but trifling inconvenience.

Having thus described my invention, I claim as new and desire to secure by Letters Patent—

1. The arm or arms N, or its or their equivalents, in combination with the platen Q, or its equivalent, when arranged to engage with the said platen or its yoke, and to draw it against the form to which it has been previously raised, substantially as and for the purpose described.

2. The rocker arm or arms $Q^2$, or its or their equivalents, arranged for operation upon the arm or arms N, or equivalent therefor, substantially as described, for the purpose specified.

3. The lever or levers $M^3$, or equivalent therefor, when arranged for operation upon the rocker arm or arms $Q^2$ of the lifting device to the impression-arms N, substantially as and for the purpose described.

4. A movable hook or clasp for holding the chase to the bed of the press when operated by lever *d*, and arranged for operation substantially as specified.

5. The lever $G^3$, or its equivalent, in combination with the frame carrying the ink-rollers to the press, when arranged for operation therewith substantially as and for the purpose described.

6. A box or receptacle, in combination with the frame carrying the platen, when arranged thereon for operation substantially as and for the purpose set forth.

7. As a means of distribution and for other purposes, detaining the inking-rollers in contact with the distributing-cylinder during the will or requirements of the operator, with or without stopping the other parts of the machine, such detention being produced by means of the lever $G^3$, or its equivalent, substantially as and for the purpose described.

J. M. JONES.

Witnesses:

JNO. W. CORNING,

IRVIN F. EGGLESTON.